E. WERZNER.
APPARATUS FOR GRANULATING LIQUID BLAST FURNACE SLAG.
APPLICATION FILED MAR. 28, 1914.
1,128,829.
Patented Feb. 16, 1915.
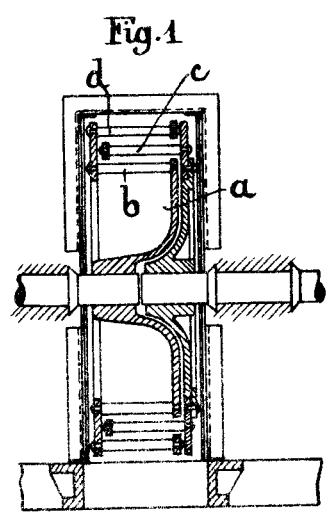
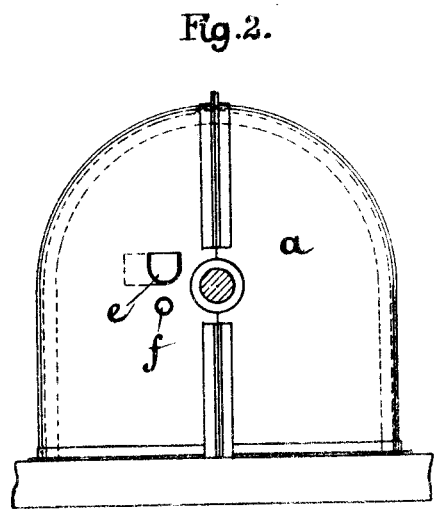
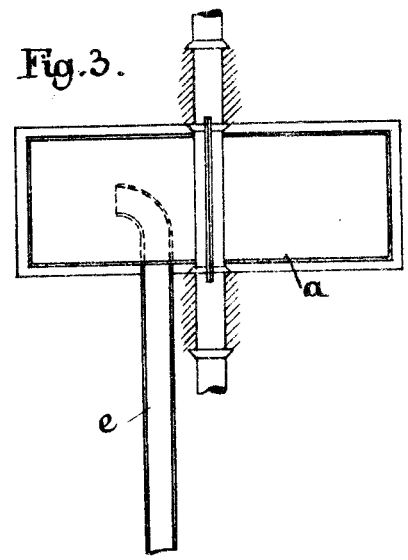

UNITED STATES PATENT OFFICE.

EDWIN WERZNER, OF TROISDORF, GERMANY.

APPARATUS FOR GRANULATING LIQUID BLAST-FURNACE SLAG.

1,128,829.

Specification of Letters Patent. Patented Feb. 16, 1915.

Application filed March 28, 1914. Serial No. 827,831.

*To all whom it may concern:*

Be it known that I, EDWIN WERZNER, a citizen of the German Empire, residing at Troisdorf, in the Province of Rhenish Prussia, Germany, have invented certain new and useful Improvements in Apparatus for Granulating Liquid Blast-Furnace Slag, of which the following is a specification.

This invention relates to a new apparatus for granulating liquid blast furnace slag by treatment with spraying water and air.

As is known the granulation of liquid blast furnace slag is effected by chilling or cooling by means of air or water. In the case of air granulation, in addition to a certain quantity of vitreous slag granules, there is a large quantity of devitrified slag granules which must partly be regarded as ballast in cement manufacture; moreover, the material readily bakes together. Granulation by means of water necessitates the employment of large quantities of water which are frequently unobtainable or only at great expense; in addition it is necessary to dry the granulated slag before treating it to form cement.

The present invention has for its object a method of eliminating the defects of water granulation and of obtaining the maximum quantities of vitreous slag granules. In order to attain this object, it has already been proposed to conduct the liquid slag to a quickly rotating cell wheel provided with a water supply. Experiments have demonstrated, however, that when this method is employed, the liquid slag does not come into contact with the periphery of the drum, so that it is not broken up mechanically.

In accordance with the invention the method is carried into practice by means of a disintegrator furnished with a water supply and to which the fiery liquid slag is conducted and is there directly cooled partly by the moist eddying air and partly by the spraying water, while the disintegrator breaks it up. Owing to the fact, that the slag is caused to fall through the mist produced by the spraying of the water and thus to come into intimate contact with the particles of water and the air, a good chilling or cooling, and consequently a high percentage of vitreous granules is obtained with a relatively small water consumption.

The apparatus serving to carry the invention into practice is diagrammatically illustrated by way of example in the accompanying drawings, in which:

Figure 1 is a longitudinal section; Fig. 2 is a side elevation, and Fig. 3 is a plan.

In the example here illustrated $a$ is a disintegrator of known construction with beater bars $b$, $c$, and $d$ rotating in different directions. The slag is admitted through the channel $e$ so that it reaches these bars. Beneath the channel $e$ a water supply pipe $f$ preferably furnished with a nozzle, is arranged. Any desired number of such spraying pipes can be provided. The operation of the apparatus is such that the slag entering the disintegrator in a fiery liquid condition falls through the mist produced by the spraying water and is vigorously cooled by intimate contact with particles of water and air, whereupon it is broken up by the bars of the disintegrator to a uniform granulation. The simultaneous supply of water and air, in addition to effecting a more efficient cooling of the slag and obtaining a higher percentage of vitreous slag granules, results in the further advantage that the bars of the disintegrator are kept cool and the formation of lumps is entirely prevented, because every piece of slag must pass between the bars and, moreover, the slag is entirely cooled.

Claims:—

1. In apparatus for granulating liquid blast furnace slag comprising a casing, an inlet chute for the slag, an inlet pipe for the cooling fluid, two independently operating disks within the casing, each of said disks being armed with a concentric row of beater rods, a row upon one disk alternating with the row on the opposite disk, the delivery means for slag and cooling fluid being adapted to deliver within the rows of beaters.

2. In apparatus for granulating liquid blast furnace slag comprising a casing, an inlet chute for the slag, an inlet pipe for the cooling fluid, said pipe being located beneath the chute, two independently operating disks within the casing, one disk carrying two concentric rows of beater rods and the other a single row intermediate of the two said rows, and the delivery means for slag and cooling fluid being adapted to deliver within the said rows of beaters.

In testimony whereof I have hereunto signed my name to this specification in the presence of two subscribing witnesses.

EDWIN WERZNER.

Witnesses:
 RUDF. V. STADLER,
 LOUIS VANDORY.